(12) United States Patent
Nishino et al.

(10) Patent No.: US 10,251,491 B2
(45) Date of Patent: Apr. 9, 2019

(54) SEAT

(71) Applicants: TACHI-S CO., LTD., Akishima-shi, Tokyo (JP); HONDA MOTOR CO., LTD., Minato-ku, Tokyo (JP)

(72) Inventors: Yoshihiko Nishino, Tokyo (JP); Tsutomu Fujikake, Tokyo (JP); Taku Nagasawa, Saitama (JP); Tomoyuki Uemura, Saitama (JP); Kazuyuki Kaneko, Saitama (JP)

(73) Assignees: TACHI-S CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/523,373

(22) PCT Filed: Nov. 24, 2015

(86) PCT No.: PCT/JP2015/082848
§ 371 (c)(1),
(2) Date: Apr. 29, 2017

(87) PCT Pub. No.: WO2016/084770
PCT Pub. Date: Jun. 2, 2016

(65) Prior Publication Data
US 2017/0303700 A1   Oct. 26, 2017

(30) Foreign Application Priority Data
Nov. 26, 2014   (JP) .................. 2014-239358

(51) Int. Cl.
*A47C 31/11*   (2006.01)
*B60N 2/60*   (2006.01)

(52) U.S. Cl.
CPC ................ *A47C 31/11* (2013.01); *B60N 2/60* (2013.01); *B60N 2/609* (2013.01)

(58) Field of Classification Search
CPC ........... A47C 31/02; A47C 31/11; B68G 7/05; B60N 2/60; B60N 2/609
See application file for complete search history.

(56) References Cited

U.S. PATENT DOCUMENTS 5,326,151 A * 7/1994 Smith .................. B60N 2/5883
                                                    297/218.4
5,338,092 A * 8/1994 Wiltsey .................. A47C 31/11
                                                    297/218.4

(Continued)

FOREIGN PATENT DOCUMENTS

JP   S61-174498 U   10/1986
JP   03-003271 Y2   1/1991

(Continued)

OTHER PUBLICATIONS

International Search Report from International Patent Application No. PCT/JP2015/082848, dated Feb. 23, 2016.

(Continued)

*Primary Examiner* — Philip F Gabler
(74) *Attorney, Agent, or Firm* — Shapiro, Gabor and Rosenberger, PLLC

(57) ABSTRACT

In order to provide a seat having enhanced apparent quality by covering a connecting part, the present invention is a seat 1 wherein a coating cover 40 for coating a first fastening part 30 is provided to an end of a surface cover 4.

8 Claims, 4 Drawing Sheets

(56) References Cited

U.S. PATENT DOCUMENTS

| | | | | |
|---|---|---|---|---|
| 9,277,828 B2* | 3/2016 | Watson | ................... | A47C 31/11 |
| 2018/0022254 A1* | 1/2018 | Nishino | ............... | B60N 2/5883 |

FOREIGN PATENT DOCUMENTS

| | | | |
|---|---|---|---|
| JP | H04-36900 U | 3/1992 | |
| JP | H06-14628 Y2 | 4/1994 | |
| JP | 2012-121440 A | 6/2012 | |
| JP | 5088126 B2 | 12/2012 | |

OTHER PUBLICATIONS

Office Action dated Dec. 12, 2017, in Japanese Patent Application No. 2014-239358.

\* cited by examiner

SEAT

TECHNICAL FIELD

The present invention relates to a seat having a surface cover detachably connected to a peripheral cover.

BACKGROUND ART

Japanese Patent No. 5088126 (Patent Literature 1) relates to the above-described technical field. The seat disclosed in the publication has the seat cushion provided with a slide fastener at the rear position of the seat surface, and on the periphery including left, right, and front surfaces. The exchangeable seat cover is engaged with the seat base, the outer surface of which is covered.

CITATION LIST

Patent Literature

PTL 1: Japanese Patent No. 5088126

SUMMARY OF INVENTION

Technical Problem

The exchangeable seat cover as described above, however, has the slide fastener as the connecting part exposed from the surface. The exposed slide fastener may impart a discomforting sense to the design, thus causing the problem of deteriorated outer appearance quality.

It is an object of the present invention to provide a seat with improved outer appearance quality by covering the connecting part.

Solution to Problem

The present invention provides a seat having a surface cover and a peripheral cover of a seat section connected via a detachable first fastening part. A coating cover for covering the first fastening part is provided at an end of the surface cover. This allows the first fastening part to be covered with the coating cover, which ensures to prevent the first fastening part from being exposed to the surface, and to improve the outer appearance quality.

Preferably, the seat section constitutes a seat cushion, and the coating cover is applied to the surface cover of the seat cushion on left, right, and front surfaces.

Preferably, the seat section constitutes a seat back, and the coating cover is applied to the surface cover of the seat back on left, right, and upper surfaces.

The coating cover contains a string member for enclosing the first fastening part, by which the first fastening part is enclosed. The first fastening part is enclosed by the coating cover that contains the string member, which ensures to assist in alignment of the coating cover along the first fastening part side, preventing opening of the coating cover.

The coating cover is sewn to an end of the surface cover with a first sewing part and a second sewing part parallel to each other. The coating cover is sewn to the end of the surface cover with the first and the second sewing parts parallel to each other. Then the coating cover hangs down toward the first fastening part for easy covering.

Advantageous Effects of Invention

The present invention improves the outer appearance quality of the seat by covering the connecting part.

DESCRIPTION OF EMBODIMENT

Figure 1:
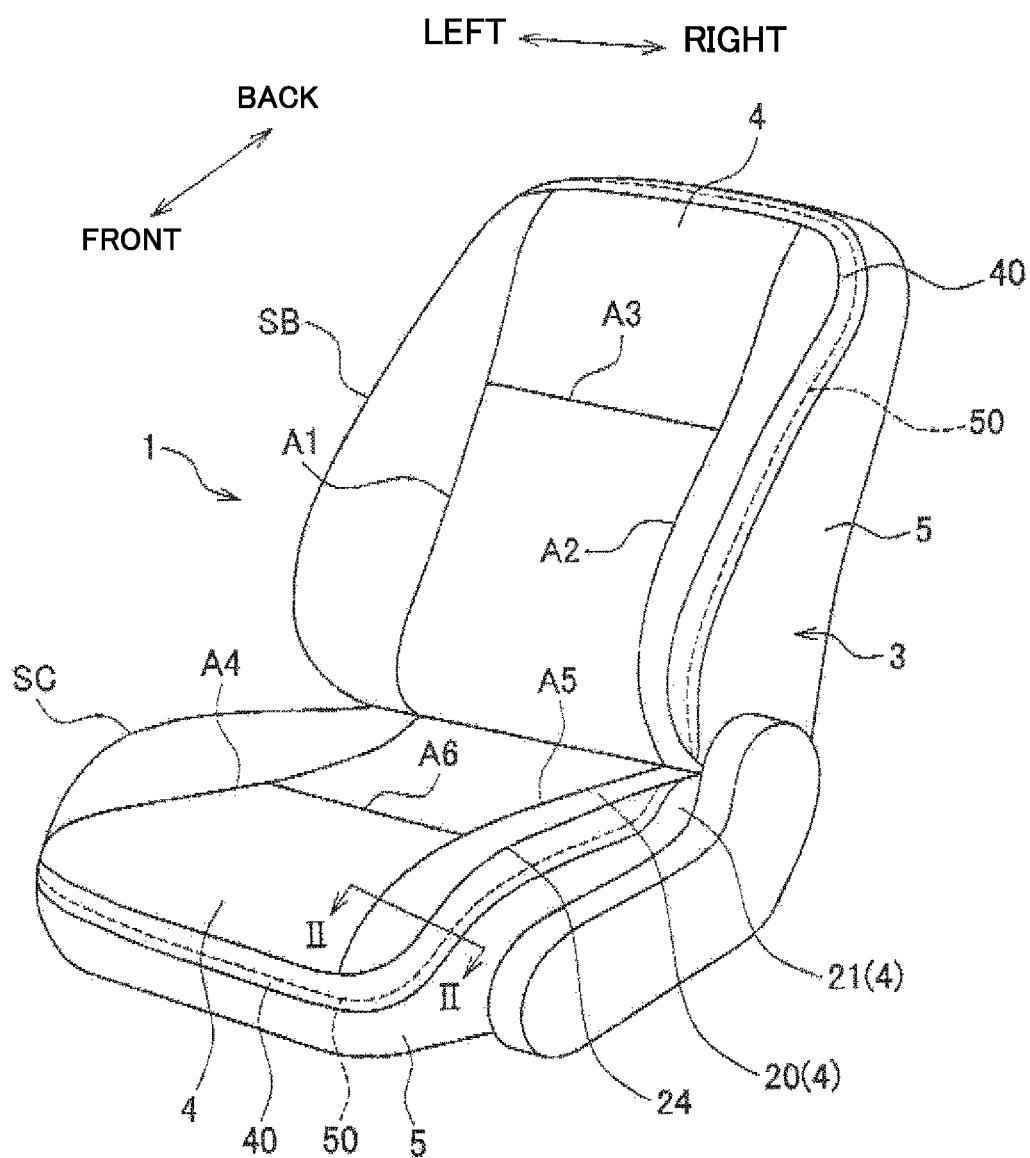
FIG. 1 is a perspective view showing a first embodiment of a seat according to the present invention.

A preferred embodiment of the seat according to the present invention will be described referring to the drawings.

As FIG. 1 shows, a vehicle seat 1 includes a seat cushion (seat section) SC which is movable back and forth on the floor panel, and a seat back (seat section) SB which is reclinable relative to the seat cushion SC. Each of the seat cushion SC and the seat back SB is formed by covering the surface of a cushion member 2 made of a foaming body with a skin 3. The skin 3 includes a surface cover 4 and a peripheral cover 5. The surface cover 4 and the peripheral cover 5 are separately formed to cover the respective cushion members 2 of the seat cushion SC and the seat back SB.

Figure 3:
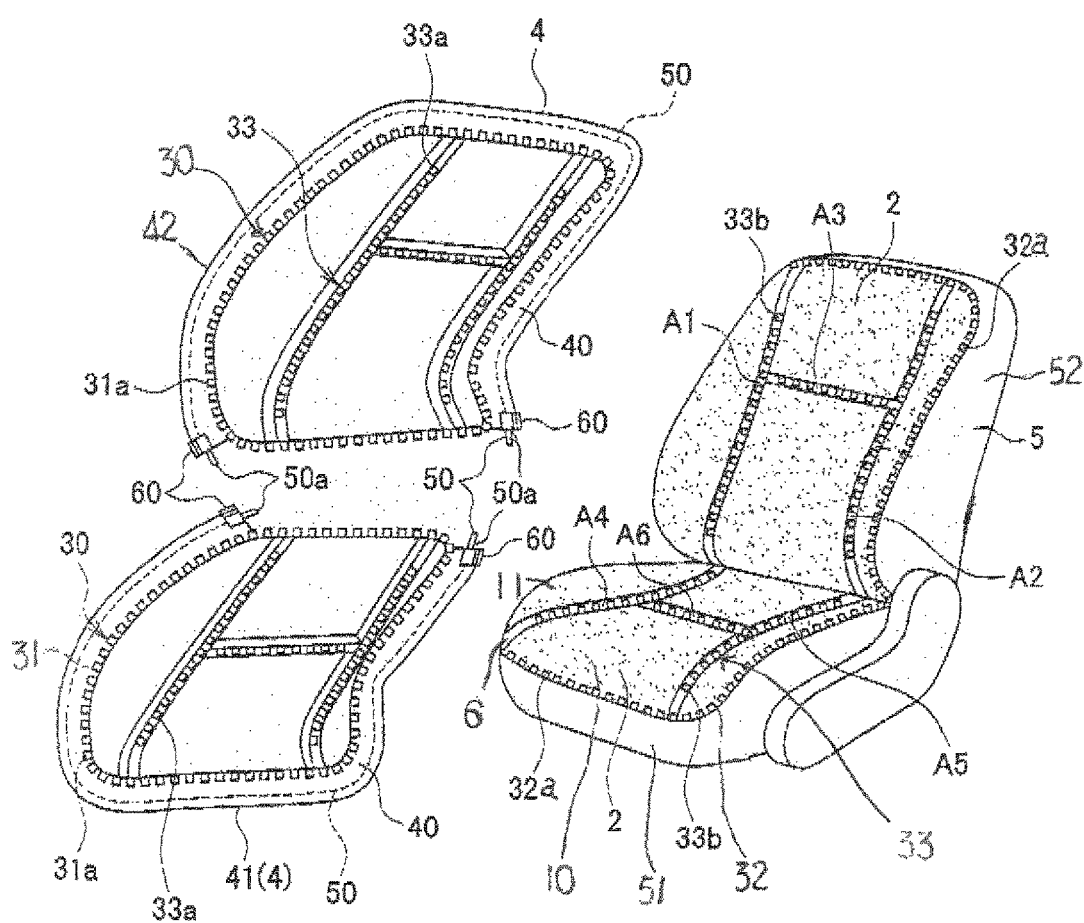
FIG. 3 is an exploded perspective view of the seat.

Referring to FIG. 3, the surface cover 4 includes a cushion surface cover 41 for covering the cushion member 2 of the seat cushion SC, and a back surface cover 42 for covering the cushion member 2 of the seat back SB. The peripheral cover 5 includes a cushion peripheral cover 51 for covering the cushion member 2 of the seat cushion SC, and a back peripheral cover 52 for covering the cushion member 2 of the seat back SB.

Linear pulling-over parts A1 to A6 are famed on the seat cushion SC and the seat back SB of the seat 1. The pulling-over parts A1 to A6 form the outer appearance of the seat 1, and prevent slack and slippage of the skin 3.

The pulling-over parts A4, A5 of the seat cushion SC include respective second fastening parts 33 for detachably connecting the cushion member 2 and the cushion surface cover 41. The detachable second fastening part 33 includes a third fastener half part 33b fixed to the cushion member 2 in a recess 6, which extends in the front-back direction along the pulling-over part A4 at the side of the cushion member 2, and a fourth fastener half part 33a detachably connected to the third fastener half part 33b, which is disposed on the cushion surface cover 41 and stored in the recess 6. The cushion member 2 of the seat cushion SC includes a main cushion part 10 for supporting the buttocks of the seated occupant, and a side cushion part 11 for holding the thigh of the seated occupant from the side. The recess 6 with predetermined depth is formed along a boundary between the main cushion part 10 and the side cushion part 11.

The pulling-over part A6 of the seat cushion SC has the structure similar to that of the pulling-over part A4, having the recess 6 extending in the left-to-right direction of the cushion member 2. The respective structures of the pulling-over parts A1 to A3 of the seat back SB are also similar to those of the pulling-over parts A4 to A6 of the seat cushion SC.

The cushion surface cover 41 includes a main surface part 20 applied to the main cushion part 10 of the cushion member 2, and a side surface part 21 applied to the side cushion part 11. The main surface part 20 and the side surface part 21 of the skin 3 are joined with a sewing part 24. The cushion surface cover 41 and the cushion peripheral cover 51 are connected on an outer side surface 11a of the side cushion part 11 with a first fastening part 30.

The detachable first fastening part 30 includes a first fastener half part 31 disposed while extending along a peripheral edge of the cushion surface cover 41, and a second fastener half part 32 disposed while extending along a peripheral edge of the cushion peripheral cover 51 so as to be detachably connected to the first fastener half part 31. The first fastening part 30 formed as a zipper is structured to connect the cushion surface cover 41 to the cushion peripheral cover 51 by making teeth 31a called element of the first fastener half part 31 in mesh with teeth 32a called element of the second fastener half part 32.

Figure 2:
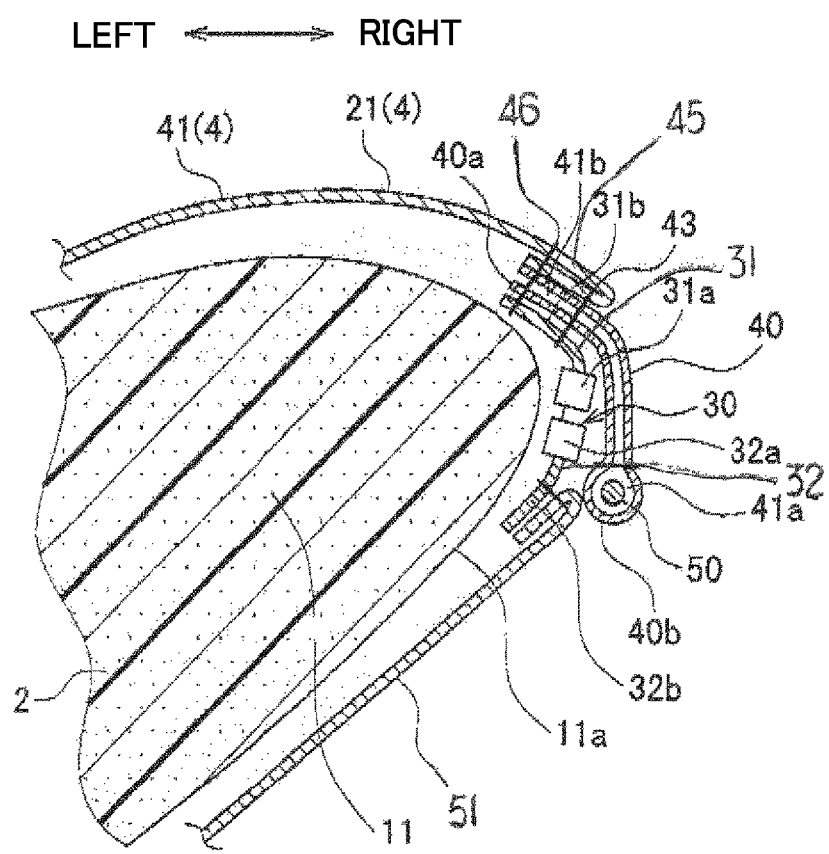
FIG. 2 is a sectional view taken along line II-II of FIG. 1.

An end 45 of the cushion surface cover 41 is provided with a coating cover 40 for covering the first fastening part 30 while extending along the left, right, and front surfaces of the cushion surface cover 41 as shown in FIG. 2.

The coating cover 40 includes an opening 40a and a folded part 40b as a result of folding the rectangular cover. An insertion hole 41a through which a string member is inserted is famed by sewing the folded part 40b.

Figure 4:
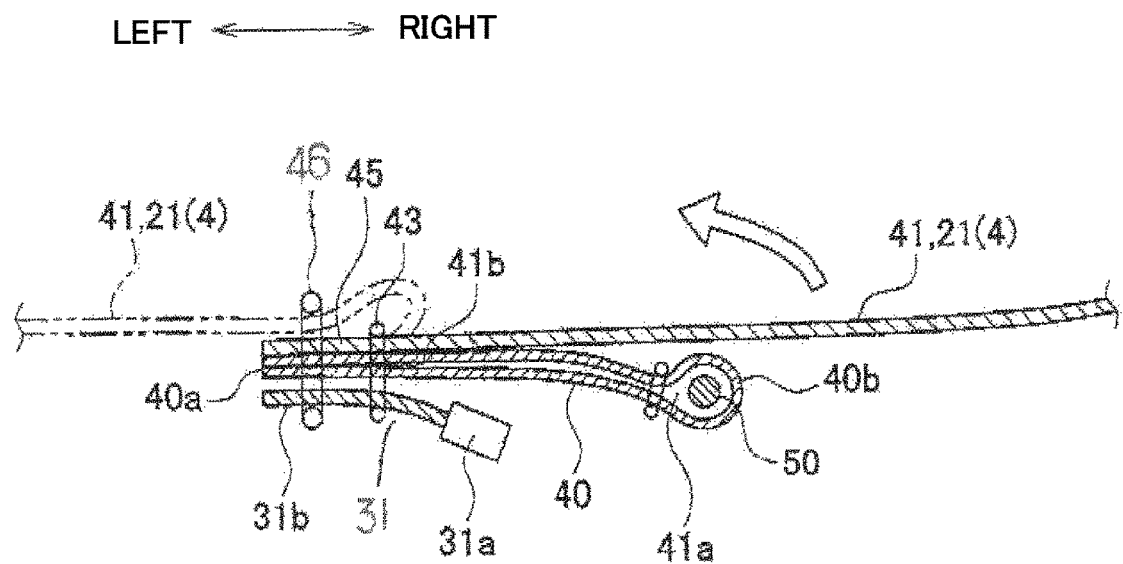
FIG. 4 is a sectional view of a connecting part as shown in FIG. 2.

As FIG. 4 shows, an end 41b of the coating cover 40 at the side of the opening 40a is fixed to the end 45 of the cushion surface cover 41 by sewing a base material 31b of the first fastener half part 31 of the first fastening part 30 to the end 45 of the cushion surface cover 41 with a first sewing part 43, folding the cushion surface cover 41 in an arrow direction to make a double stitch at the end 45 of the cushion surface cover 41, and sewing the end 41b of the coating cover 40 at the side of the opening 40a to the base material 31b of the first fastener half part 31 of the first fastening part 30 with a second sewing part 46 parallel to the first sewing part 43.

The end 41b of the coating cover 40 at the side of the opening 40a is sewn to the end 45 of the cushion surface cover 41 with the first sewing part 43 and the second sewing part 46 parallel to each other. As a result, the coating cover 40 at the side of the folded part 40b is likely to hang down toward the first fastener half part 31 of the first fastening part 30. This allows easy covering of the first fastening part 30.

The insertion hole 41a of the coating cover 40 allows insertion of the string member 50. As FIG. 3 shows, an end 50a of the string member 50 at the rear surface side of the cushion surface cover 41 protrudes outside from the coating cover 40.

As FIGS. 1 and 2 show, when fastening the first fastening part 30 and the second fastening part 33 for applying the cushion surface cover 41 to the cushion member 2 of the seat cushion SC for covering, the coating cover 40 becomes ready to cover the first fastening part 30 without being exposed to the surface, resulting in improved outer appearance quality.

As FIG. 3 shows, upon pulling of both ends 50a, 50a of the string member 50, the folded part 40b of the coating cover 40 shrinks. Upon securing the ends 50a, 50a of the string member 50 to the coating cover 40 with respective clips 60, the folded part 40b of the coating cover 40 becomes tense. The coating cover 40 ensures to cover the first fastening part 30 without turning up while eliminating the gap from the coating cover 40. As the folded part 40b of the coating cover 40 shrinks, the outer appearance of the resultant shrink pattern is improved.

The soft resin bead core, the stainless wire, the kite string and the like may be used for forming the string member 50.

As the structure of the seat back SB is substantially the same as that of the seat cushion SC, the essential part of the seat back SB will be described.

Referring to FIG. 3, the coating cover 40 is provided along left, right, and upper surfaces of the seat back SB, having both ends 50a of the string member 50 extending to the outside from the lower ends of the left and right surfaces.

In the state where the back surface cover 42 is fastened with the first fastening part 30 and the second fastening part 33, upon pulling of both ends 50a of the string member 50 of the coating cover 40, the folded part 40b of the coating cover 40 shrinks. Upon securing both ends 50a, 50a of the string member 50 to the coating cover 40 with respective clips 60, the coating cover 40 ensures to cover the first fastening part 30 without turning up the folded part 40b of the coating cover 40 while eliminating the gap therefrom. As the folded part 40b of the coating cover 40 shrinks, the outer appearance of the resultant shrink pattern is improved.

The string member is capable of adjusting the tense state of the folded part 40b of the coating cover 40 depending on the state of pulling both ends 50a. The resultant structure becomes adaptable to various changes in the shape of the first fastening part 30.

The seat according to the present invention is applicable to seats for automobile, airplane, train, bus, passenger ship and the like. It is also applicable to cover the fastener of a top of the convertible car. The description with respect to the exchangeable seat cover has been made. However, it is to be understood that the present invention is not limited to such seat as described above.

It is to be understood that the present invention is not limited to the aforementioned embodiment.

LIST OF REFERENCE SIGNS

1: seat,
2: cushion member,
3: skin,
4: surface cover,
5: peripheral cover,
30: first fastening part,
31: first fastener half part,
32: second fastener half part,
33: second fastening part,
A1-A6: pulling-over part,
SB: seat back (seat section),
SC: seat cushion (seat section),
40: coating cover,
50: string member

The invention claimed is:

1. A seat having a surface cover and a peripheral cover of a seat section connected via a detachable first fastening part, the surface cover being disposed to face an occupant of the seat, wherein a coating cover for covering the first fastening part is provided at an end of the surface cover, the coating cover contains a string member for enclosing the first fastening part, and clips are provided for securing both ends of the string member.

2. The seat according to claim 1,
wherein the seat section constitutes a seat cushion;
the first fastening part is disposed on left, right, and front surfaces of the seat cushion; and the coating cover is applied to the surface cover of the seat cushion on the left, right, and front surfaces.

3. The seat according to claim 1, wherein the seat section constitutes a seat back;

the first fastening part is disposed on left, right, and upper surfaces of the seat back; and the coating cover is applied to the surface cover of the seat back on left, right, and upper surfaces.

4. The seat according to claim 1, wherein the first fastening part is enclosed by the string member.

5. The seat according to claim 1, wherein the coating cover is sewn to an end of the surface cover with a first sewing part and a second sewing part parallel to each other.

6. A seat having a seat cushion and a seat back each constituting a seat section, wherein at least one of the seat sections is covered by respective surface and peripheral covers connected via a detachable fastening part, the surface cover being disposed to face an occupant of the seat, the fastening part is disposed on left and right surfaces of the respective seat section and on an intermediate surface of that seat section joining the left and right surfaces, a further cover is attached to the respective surface cover along the left, right and intermediate surfaces to cover the fastening part, the further cover includes a string member extending lengthwise of the further cover for tightening the further cover along the fastening part, and clips are provided for securing ends of the string member in a tightened state of the further cover.

7. The seat according to claim 6, wherein the one seat section is the seat cushion and the intermediate surface is a front surface of the seat cushion.

8. The seat according to claim 6, wherein the one seat section is the seat back and the intermediate surface is an upper surface of the seat back.

* * * * *